US008400266B2

(12) United States Patent
Ikeda

(10) Patent No.: US 8,400,266 B2
(45) Date of Patent: Mar. 19, 2013

(54) MONITORING DEVICE, MONITORING METHOD, AND MONITORING PROGRAM

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1137 days.

(21) Appl. No.: 12/327,969

(22) Filed: Dec. 4, 2008

(65) Prior Publication Data

US 2009/0146817 A1 Jun. 11, 2009

(30) Foreign Application Priority Data

Dec. 5, 2007 (JP) ................................. 2007-314351

(51) Int. Cl.

*G05B 19/00* (2006.01)
*G06F 17/00* (2006.01)
*H04B 7/00* (2006.01)
*G06K 9/00* (2006.01)
*G06Q 10/00* (2012.01)

(52) U.S. Cl. ......... 340/5.8; 235/375; 370/310; 382/115; 705/28

(58) Field of Classification Search ................... 340/5.8, 340/567, 539.15; 235/384; 370/329; 455/414.2, 455/426; 382/118; 705/28

See application file for complete search history.

(56) References Cited

U.S. PATENT DOCUMENTS 6,990,588 B1 * 1/2006 Yasukura ...................... 713/186
7,164,354 B1 * 1/2007 Panzer ..................... 340/539.15
7,802,724 B1 * 9/2010 Nohr ............................ 235/384
2002/0147008 A1 * 10/2002 Kallio .......................... 455/426
2002/0177922 A1 * 11/2002 Bloom .......................... 700/213
2003/0005326 A1 * 1/2003 Flemming ..................... 713/201
2004/0032326 A1 * 2/2004 Nakamura et al. ............ 340/567
2004/0188185 A1 * 9/2004 Pieper ........................... 187/391
2007/0031010 A1 * 2/2007 Sukegawa et al. ............ 382/118
2007/0056041 A1 * 3/2007 Goodman ...................... 726/26
2007/0233582 A1 * 10/2007 Abhyanker ..................... 705/28
2007/0293202 A1 * 12/2007 Moshir et al. .............. 455/414.2
2008/0222417 A1 * 9/2008 Downes et al. ............... 713/172
2008/0267117 A1 * 10/2008 Stern ............................ 370/329

FOREIGN PATENT DOCUMENTS

JP 2005-284370 10/2005
JP 2006-79236 3/2006

* cited by examiner

*Primary Examiner* — George Bugg
*Assistant Examiner* — Renee Dorsey
(74) *Attorney, Agent, or Firm* — Young & Thompson

(57) ABSTRACT

To continuously detect a suspicious person, and to provide information for identifying the suspicious person, a monitoring device for monitoring an object existing in a detection area includes: a detection unit for detecting existence of the object in the detection area; an authentication information acquisition unit for acquiring authentication information held by the detected object; a registered authentication information storage unit for storing registered authentication information on an object admitted into the detection area; a determination unit for acquiring, based on the authentication information and the registered authentication information, a number of registered authentication objects and a number of unregistered authentication objects, for setting an alert mode when the detection unit detects the existence of the object, and when the number of registered authentication objects is zero, and for determining a suspicious object based on the number of registered authentication objects, the number of unregistered authentication objects, and the alert mode; and an alarming/notifying unit for notifying an alarm based on a result of determination by the determination unit.

20 Claims, 4 Drawing Sheets

MONITORING DEVICE, MONITORING METHOD, AND MONITORING PROGRAM

BACKGROUND OF THE INVENTION

1. Field of the Invention

The present invention relates to a monitoring device, a monitoring method, and a monitoring program, and more particularly, to a monitoring device, a monitoring method, and a monitoring program for detecting/identifying a suspicious person.

2. Description of the Related Art

Recently, devices for monitoring suspicious persons have been employed to detect suspicious persons in detection areas, and, upon detection, to issue an alarm/notice of the existence thereof. A related technology is disclosed in Japanese Patent Application Laid-open No. 2005-284370. A security system described in Japanese Patent Application Laid-open No. 2005-284370 detects a person (object) in a detection area by means of a human detection sensor. Moreover, this security system according to Japanese Patent Application Laid-open No. 2005-284370 reads an identification (ID) number of an IC tag using an IC tag reader, and collates the read ID number to registered ID numbers. Then, when the read ID number is registered, this security system according to Japanese Patent Application Laid-open No. 2005-284370 does not generate an alarm (such as sound)/notice. In other words, when an ID number cannot be read (cannot be received by IC tag reader) or when the read ID number is not registered, this security system generates an alarm (such as sound)/notice of the existence of a suspicious person. This security system according to Japanese Patent Application Laid-open No. 2005-284370 recognizes a person without carrying an IC tag or a person carrying an invalid IC tag as a suspicious person.

Japanese Patent Application Laid-open No. 2006-79236 discloses a system, which is intended to be installed at a common entrance of a housing complex, for identifying residents thereby providing information thereon for managing passers-by. This system according to Japanese Patent Application Laid-open No. 2006-79236 determines whether or not a passer-by is a resident at the part used by the residents in common of the housing complex, unlocks the entrance, and confirms an entrance of a person who is not a resident to the housing complex. As a result, the system according to Japanese Patent Application Laid-open No. 2006-79236 can increase security at the part used by the residents in common.

A first problem with the security system according to Japanese Patent Application Laid-open No. 2005-284370 is that a suspicious person cannot be detected because, even when a person without an IC tag is detected in the detection area and the alarm/notice is thus generated, once a permitted person with an IC tag with a registered ID number enters the detection area, the alarm/notice stops while the suspicious person still exists. This is because this security system according to Japanese Patent Application Laid-open No. 2005-284370 determines that a person has the permission based only on the fact that an ID number of an IC tag read by the IC tag reader upon detection of a person (object) by the human detection sensor is registered, and determines that a person without a registered ID number is a suspicious person.

A second problem with this security system according to Japanese Patent Application Laid-open No. 2005-284370 is that, once the alarm/notice stops, when security staff rush to the detection area and a plurality of persons exist in the detection area, it is not possible to determine whether or not the plurality of persons include the suspicious person. Moreover, this security system according to Japanese Patent Application Laid-open No. 2005-284370 has a problem that, when there are the suspicious person and at least one permitted person in the detection area, and then, the suspicious person leaves the detection area, the security staff cannot distinguish the suspicious person. In other words, this security system according to Japanese Patent Application Laid-open No. 2005-284370 has a problem that it is hard for the security staff to identify a suspicious person by actually observing the detection area. This is because this security system according to Japanese Patent Application Laid-open No. 2005-284370 carries out an alarm/notice only based on the information on whether or not a suspicious person exists, but does not provide information for identifying the suspicious person.

Moreover, though the system according to Japanese Patent Application Laid-open No. 2006-79236 can be used to confirm that a person other than the residents enters the housing complex, and to confirm that a person who is passing by the sensor is a non-resident, there is a problem that the system does not offer a function of continuously monitoring a suspicious person.

These problems possibly happen frequently in a crowded corridor, lobby, or the like.

SUMMARY OF THE INVENTION

It is therefore an object of the present invention to provide a monitoring device, a monitoring method, and a monitoring program for continuously detecting a suspicious person (or suspicious object), and providing information for identifying the suspicious person (or suspicious object).

A monitoring device 10*a* for monitoring an object existing in a detection area includes: a detection unit 1 for detecting existence of the object in the detection area; an authentication information acquisition unit 2 for acquiring authentication information held by the detected object; a registered authentication information storage unit 41 for storing registered authentication information on an object admitted into the detection area; a determination unit 31 for acquiring, based on the authentication information and the registered authentication information, a number of registered authentication objects and a number of unregistered authentication objects, for setting an alert mode when the detection unit 1 detects the existence of the object, and when the number of registered authentication objects is zero, and for determining a suspicious object based on the number of registered authentication objects, the number of unregistered authentication objects, and the alert mode; and an alarming/notifying unit 5 for notifying an alarm based on a result of determination by the determination unit 31.

The monitoring system according to the present invention can continuously detect the suspicious person (or suspicious object), and further, provide the information for identifying the suspicious person (or suspicious object).

DETAILED DESCRIPTION OF THE PREFERRED EMBODIMENTS

Descriptions are now given of embodiments of the present invention referring to drawings. For the sake of clarity, the following descriptions and the drawings are abbreviated or simplified as appropriate. In the respective drawings, components having like configurations and functions, and parts corresponding thereto are denoted by like symbols, and a duplicated description thereof is omitted. A monitoring device, a monitoring method, and a monitoring program according to the present invention continuously monitor an object which has entered a detection area. Descriptions are now given of the embodiments.

Figure 1:
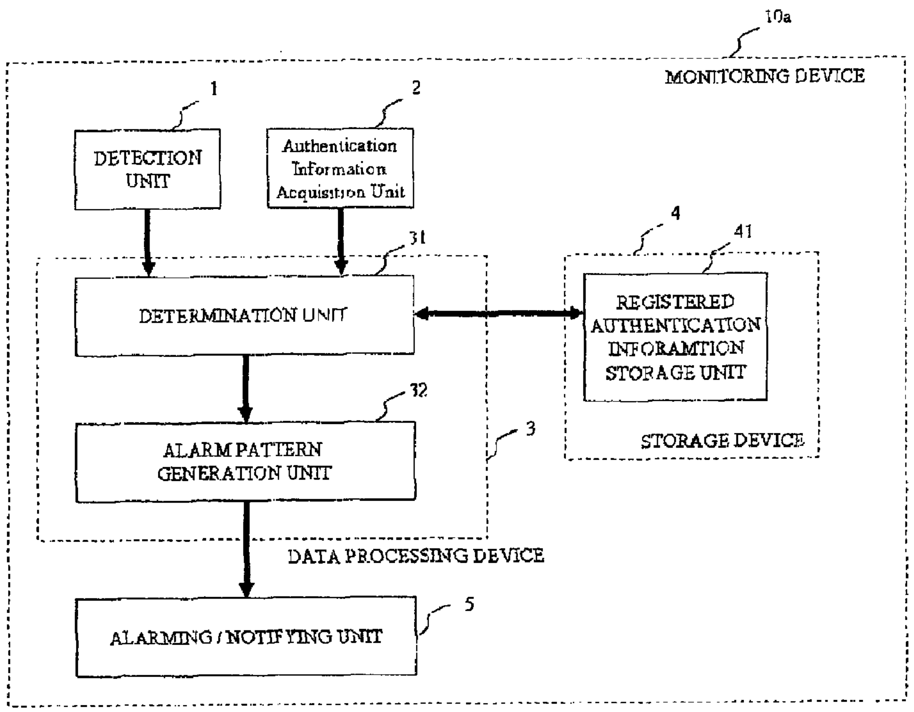
FIG. 1 is a block diagram illustrating an example of a configuration of a monitoring device according to a first embodiment of the present invention.

A detailed description is now given of a first embodiment of the present invention with reference to drawings. FIG. 1 is a block diagram illustrating an example of a configuration of a monitoring device (suspicious person monitoring device) according to the first embodiment. Referring to FIG. 1, a monitoring device 10*a* according to the first embodiment of the present invention includes a detection unit (human detection unit and object detection unit) 1, an authentication information acquisition unit 2, a data processing device 3, a storage device 4, and an alarming/notifying unit (notification unit) 5. According to this embodiment, a description is given of a method and device for continuously monitoring a suspicious person as an object to be monitored.

The detection unit 1 detects existence of a person (object) in the detection area. The authentication information acquisition unit 2 acquires and stores authentication information (such as ID number of IC tag) existing in the detection area. The data processing device 3 operates according to program control based on information on a person detected by the detection unit 1, and the authentication information acquired by the authentication information acquisition unit 2. The storage device 4 stores information. The alarming/notifying unit 5 issues an alarm/notice of information on detection of a suspicious person or information for identifying a suspicious person.

The detection unit 1 is a device for detecting existence of a person in the detection area, and a human detection sensor or a camera for acquiring an image through image processing may be employed as the detection unit 1. The alarming/notifying unit 5 is a device for issuing an alarm/notice of the information on the detection of a suspicious person or the information for identifying a suspicious person, and a device such as an illumination or an LED for generating light, a device such as a speaker for generating sounds and voices, or an external output device based on communication may be employed. The device for generating light, sounds, and voices may be installed on a ceiling or on a floor.

The storage device 4 includes a registered authentication information storage unit 41. The registered authentication information storage unit 41 stores authentication information on persons who are admitted into the detection area (hereinafter, referred to as "registered authentication information" as appropriate).

The data processing device 3 includes a determination unit (suspicious person determination unit) 31 and an alarm pattern generation unit 32.

The determination unit 31 receives, from the detection unit 1, a notice that a person (object) exists in the detection area. Moreover, the determination unit 31 acquires, from the authentication information acquisition unit 2, all authentication information (hereinafter, referred to as "detected authentication information" as appropriate) existing in the detection area. Then, the determination unit 31 collates the acquired authentication information to the authentication information registered to the registered authentication information storage unit 41. The determination unit 31, based on a result of the collation, calculates the number of registered authentication objects (number of pieces of registered authentication information) n1 which is registered to the registered authentication information storage unit 41, and the number of unregistered authentication objects (number of pieces of unregistered authentication information) n2 which is not registered to the registered authentication information storage unit 41. The number of registered authentication objects represents the number of objects holding authentication information matching the registered authentication information, and the number of unregistered authentication objects represents the number of objects holding authentication information which is not registered. When n1 is zero, the determination unit 31 sets an alert mode, and determines that all the persons in the detection area are suspicious persons. The determination unit 31 sets the alert mode in order to continuously detect the suspicious persons even when a permitted person holding the authentication information enters the detection area after the suspicious persons are detected.

Moreover, the determination unit 31 determines, when the number of registered authentication objects is equal to or more than 1 (n1≠0), and the number of unregistered authentication objects is equal to or more than 1 (n2≠0), that some of the persons in the detection area are suspicious persons. Further, the determination unit 31 determines, when all the above-mentioned conditions are not met (n1≠0 and n2=0), and the alert mode is set, that a suspicious person possibly exists in the detection area (warning about suspicious person).

The alarm pattern generation unit 32, based on a result of the determination made by the determination unit 31, generates an alarm pattern. Specifically, the alarm pattern generation unit 32, when it is determined that all the persons in the detection area are suspicious persons, generates an alarm pattern 1. The alarm pattern generation unit 32, when it is determined that some of the persons in the detection area are suspicious persons, generates an alarm pattern 2. The alarm pattern generation unit 32, when it is determined that a suspicious person possibly exists in the detection area, generates an alarm pattern 3 representing the number of registered authentication objects n1. When the alarm pattern representing the detection of a suspicious person or information for identifying the suspicious person is generated, the alarming/notifying unit 5 carries out the alarm/notification using the generated alarm pattern. As examples of the alarm patterns, when the alarming/notifying unit 5 is an LED, the alarm pattern 1 is continuous lighting of the LED, the alarm pattern 2 is flashing of the LED, and the alarm pattern 3 is a repetition of a combination of flashing of the LED, the number of times of which corresponds to the number of the acquired registered authentication objects n1, and an interval. Any forms may be employed as long as alarm patterns are distinguishable. As other examples, when the alarming/notifying unit 5 is a device emitting light such as an illumination or an LED, the alarming/notifying unit 5 can show the differences among the alarm patterns using shapes of a light source/projected light (star, cross, and number), patterns of a light source/projected light (checkered patter and stripe pattern), colors of a light source/projected light, flashing timings, and the number of active lightings. When the alarming/notifying unit 5 is a device generating sounds and voices, the alarming/notifying unit 5 can show the differences among the alarm patterns using melodies, frequencies of sounds, and human voices.

Security staff or the like can identify suspicious persons based on the number of persons in the detection area, movements thereof, and the alarm pattern. When the alarm pattern 1 is generated, since all the persons in the detection area are suspicious persons, the suspicious persons can be identified. When the alarm pattern 2 is generated, since some of the persons in the detection area are suspicious persons, it is possible to identify the suspicious persons by observing a change in alarm pattern caused by entrance/exit to/from the detection area. When the alarm pattern 3 is generated, since a suspicious person possibly exists in the detection area, it is possible to determine whether or not a suspicious person exists in the detection area by comparing the number of the persons in the detection area and the number of registered authentication objects nil (number of persons admitted into detection area) determined by the alarm pattern. On this occasion, when a suspicious person exists, it is possible to identify the suspicious person by observing a change in alarm pattern caused by the entrance/exit to/from the detection area. The alarm pattern 3 is also effective for providing warning for the security staffs and the like.

In a crowded corridor, lobby, or the like, it is conceivable that the change in alarm pattern frequently occurs, and, by installing a plurality of devices according to the present invention in the detection area, it is possible to more clearly recognize behaviors and movements of suspicious persons, thereby providing an effect of promoting the identification of the suspicious persons.

Figure 2:
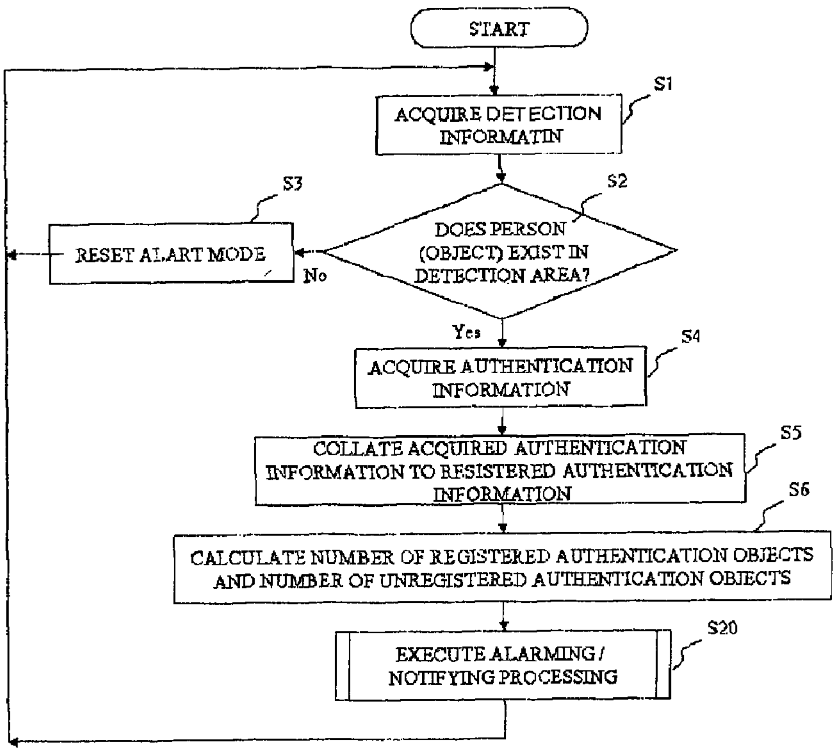
FIG. 2 is a flowchart illustrating an example of an operation of the monitoring device according to the first embodiment of the present invention.
Figure 3:
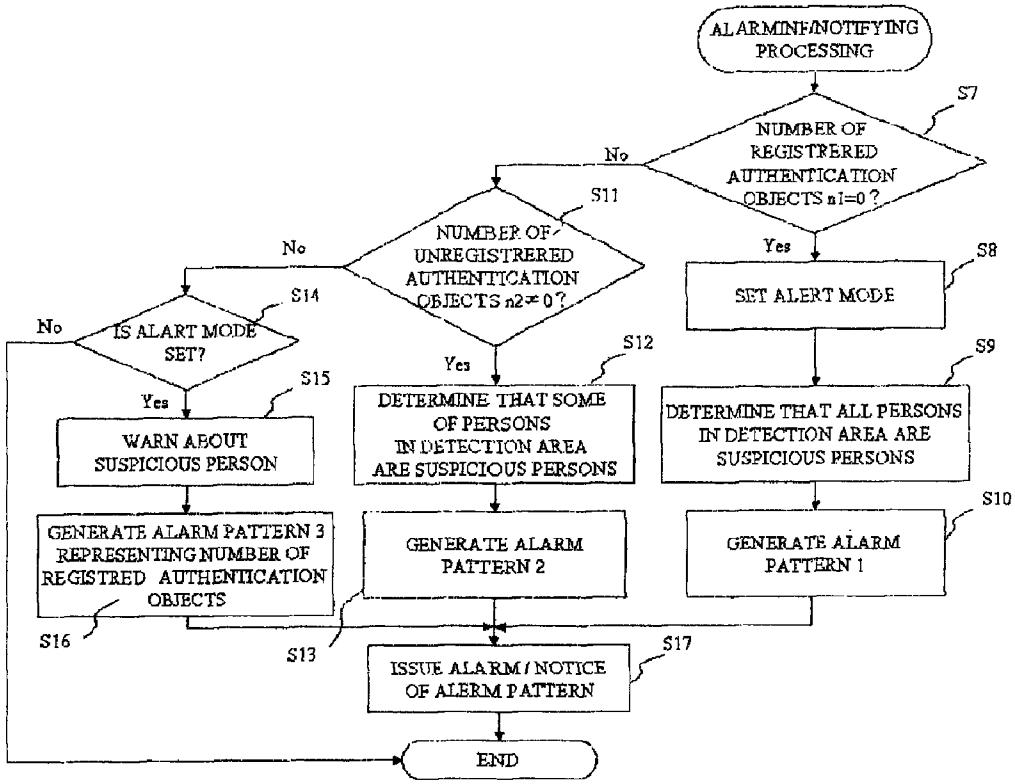
FIG. 3 is a flowchart illustrating an example of an operation of alarming/notifying processing carried out by the monitoring device according to the first embodiment of the present invention.

Referring to FIGS. 1, 2, and 3, a detailed description is now given of an operation of a best mode for embodying the present invention. FIG. 2 is a flowchart illustrating an example of an operation of the monitoring device. FIG. 3 is a flowchart illustrating an example of an operation of alarming/notifying processing.

First, the determination unit 31 acquires, from the detection unit 1, the human detection information which represents whether or not a person exists in the detection area (Step S1). Then, the determination unit 31 determines whether or not a person exists in the detection area based on the acquired human detection information (Step S2). When a person does not exist ("NO" in Step S2), the determination unit 31 resets the alert mode (Step S3), and returns to Step S1. On the other hand, when a person exists ("YES" in Step S2), the determination unit 31 acquires the detected authentication information on all the persons existing in the detection area from the authentication information acquisition unit 2 (Step S4), and collates the acquired detected authentication information to the registered authentication information registered to the registered authentication information storage unit 41 (Step S5). The determination unit 31, based on the result of the collation, calculates the number of registered authentication objects n1 representing the number of pieces of the detected authentication information registered to the registered authentication information storage unit 41 and the number of unregistered authentication objects n2 representing the number of pieces of the detected authentication information which are not registered to the registered authentication information storage unit 41 (Step S6).

Then, the determination unit 31 carries out the alarming/notifying processing (Step S20), specifically, processing illustrated in FIG. 3. First, the determination unit 31 determines whether or not the number of registered authentication objects n1 is zero (Step S7). When n1 is zero, the determination unit 31 sets the alert mode (Step S8), and determines that all the persons in the detection area are suspicious persons (Step S9). In response to this determination, the alarm pattern generation unit 32 generates the alarm pattern 1 (Step S10).

When n1 is not zero, the determination unit 31 determines whether or not the number of unregistered authentication objects n2 is not zero (Step S11). When n2 is not zero ("NO" in Step S11), the determination unit 31 determines that some of the persons in the detection area are suspicious persons (Step S12), and the alarm pattern generation unit 32 generates the alarm pattern 2 (Step S13). When n2 is zero ("YES" in Step S11), the determination unit 31 determines whether or not the alert mode is set (Step S14). When the alert mode is set, the determination unit 31 determines that a suspicious person may exist in the detection area (warning about suspicious person) (Step S15), and the alarm pattern generation unit 32 generates the alarm pattern 3 representing the number of the acquired registered authentication objects n1 (Step S16). When the alert mode is not set, the processing simply returns to Step S1. Finally, the alarm pattern generation unit 32 uses the alarming/notifying unit 5 to issue an alarm/notice of the alarm pattern generated in the steps S10, S13, or S16 (Step S17).

According to this embodiment, when the existence of a person in the detection area is detected, and when the number of registered authentication objects is zero, the determination unit 31 determines that all the persons in the detection area are suspicious persons, and sets the alert mode. Thus, the suspicious persons who do not hold the authentication information are detected in the detection area. Moreover, even when a permitted person holding the registered authentication information enters the detection area after the detection, the alert mode, which has been set, remains active, the alarm/notification does not stop, and the suspicious person is continuously detected.

Moreover, according to this embodiment, the determination unit 31, upon detection of the existence of a person in the detection area, determines whether or not a suspicious person exists according to the plurality of conditions based on the information including the number of registered authentication objects, the number of unregistered authentication objects, and the alert mode set when the number of pieces of the registered authentication information is zero. When the determination unit 31 determines that a suspicious person exists, the alarm pattern generation unit 32 generates the different alarm patterns according to the determination conditions so that the suspicious person can be identified. As a result, it is possible to detect the suspicious person, to recognize the state of the suspicious person in the detection area (state as to whether all or some persons in detection area are suspicious), and further, to identify the suspicious persons by observing changes in alarm pattern caused by the entrance/exit to/from the detection area.

Figure 4:
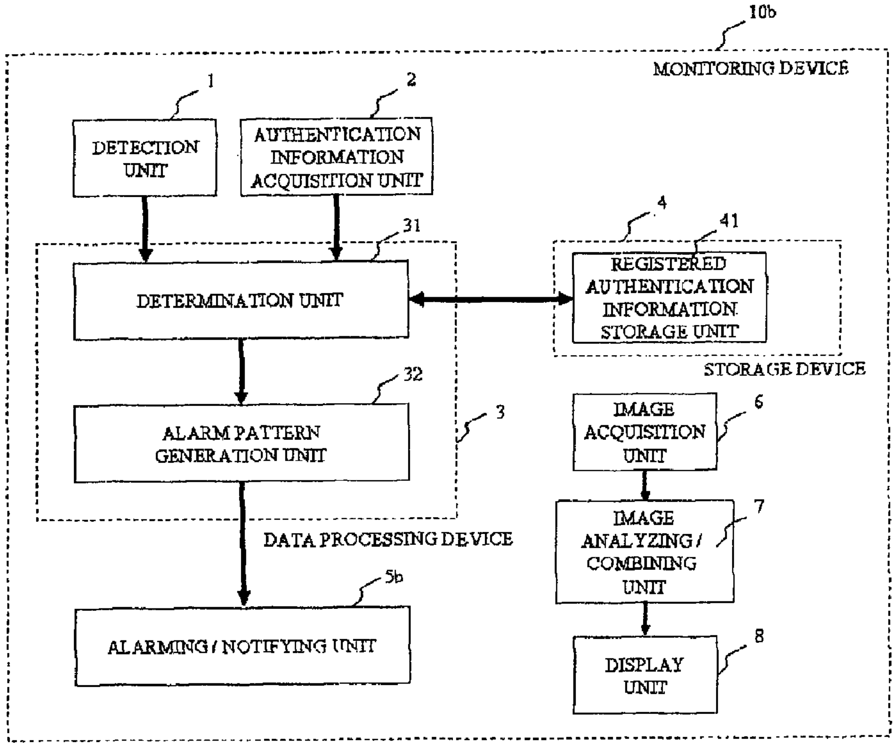
FIG. 4 is a block diagram illustrating an example of a configuration of a monitoring device according to a second embodiment of the present invention.

A detailed description is now given of a second embodiment of the present invention with reference to drawings. FIG. 4 is a block diagram illustrating an example of a configuration of a monitoring device according to the second embodiment. Referring to FIG. 4, a monitoring device 10*b* according to the second embodiment has a configuration in which the alarming/notifying unit 5 is changed to an alarming/notifying unit 5*b* to which functions are added, and an image acquisition unit 6, an image analyzing/combining unit 7, and a display unit 8 are added to the monitoring device 10*a*.

The alarming/notifying unit 5*b* is special illumination which cannot usually be sensed, and is, for example, fluorescent light which flashes at a high speed, and flashing patterns thereof can be controlled, or infrared illumination. The special illumination which cannot usually be sensed is an illumination device whose alarm patterns cannot be recognized by ordinary viewing but can be recognized from an image acquired by an imaging device corresponding to the illumination device. Moreover, the high-speed flashing is a flashing as fast as a speed which cannot be recognized as flashing by ordinary viewing.

The image acquisition unit 6 acquires, as an image, the special illumination provided by the alarming/notifying unit 5*b* and a person (object). For example, the image acquisition unit 6 is a high-speed camera when the alarming/notifying unit 5*b* is fluorescent light flashing at a high speed, and is an infrared camera when the alarming/notifying unit 5*b* is infrared illumination. The image acquisition unit 6 may acquire an image in response to a notice received from the alarming/notifying unit 5*b*, or may periodically acquire an image.

Figure 5:
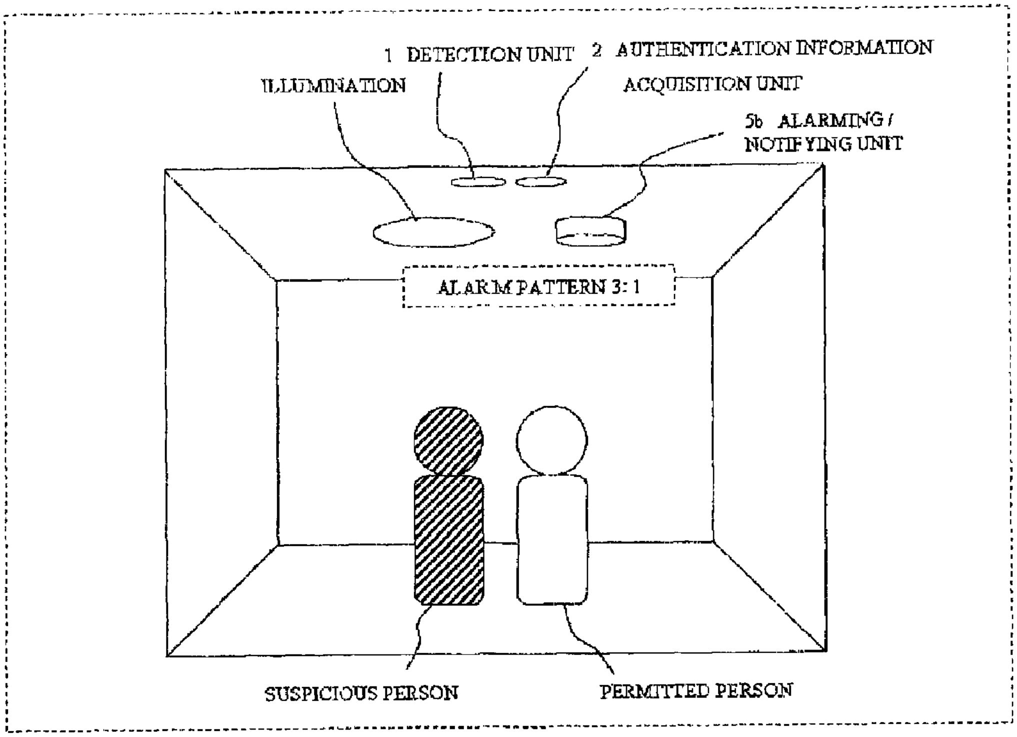
FIG. 5 is a diagram illustrating an example of a combined image according to the second embodiment of the present invention.

The image analyzing/combining unit 7 detects the alarm pattern indicated by the special illumination from the image acquired by the image acquisition unit 6, reads information (such as the alarm pattern 1, the alarm pattern 2, the alarm pattern 3, the number of the acquired registered authentication objects n1, and the alarm pattern itself) therefrom, and combines the image and the information on the alarm pattern with each other. As an example of the combining method, the information on the read alarm pattern is superimposed on a position of the image at which the alarm pattern is detected, or when the alarming/notifying unit 5*b* is infrared illumination, the illuminated alarm pattern is enhanced and then is superimposed. FIG. 5 illustrates an example of the combined image. There are various positions and various representations for the combining, and the example of FIG. 5 illustrates one example.

The display unit 8 displays the combined image produced by the image analyzing/combining unit 7.

According to the second embodiment, it is effective to illustrate simultaneously the detection area and the alarming/notifying unit 5*b* illustrating the alarm for the detection area in the image acquired by the image acquisition unit 6, and thus the alarming/notifying unit 5*b* illustrating the alarm of the detection area is desirably installed close to the detection area.

Figure 6:
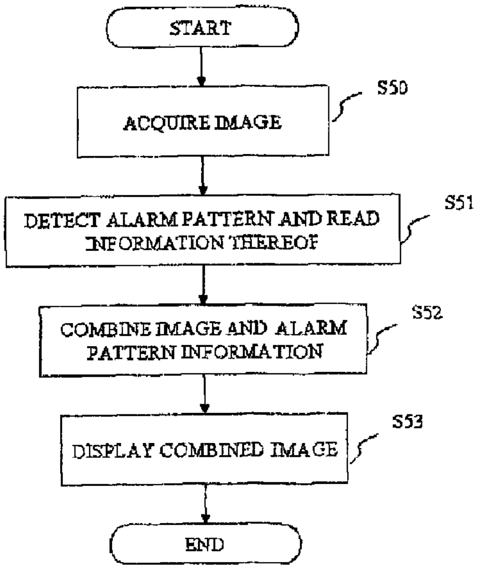
FIG. 6 is a flowchart illustrating an example of an operation of image displaying carried out by the monitoring device according to the second embodiment of the present invention.

Referring to FIGS. 4 and 6, a detailed description is given of an operation of this embodiment of the present invention.

The operation of the monitoring device 10*b* according to the second embodiment is the operation of the first embodiment illustrated in FIGS. 2 and 3 with additional steps S50, S51, S52, and S53 of FIG. 6. Respective steps illustrated in FIG. 6 may be carried out subsequently to Step S17 illustrated in FIG. 4, or may be carried out periodically. The other steps are the same as those according to the first embodiment, and hence the description thereof is omitted.

The image acquisition unit 6 acquires an image (Step S50). The image analyzing/combining unit 7 detects the alarm pattern indicated by the special illumination from the image acquired by the image acquisition unit 6, reads information therefrom (Step S51), and combines the image and the information of the alarm pattern with each other (Step S52). The display unit 8 displays the combined image (Step S53).

According to this embodiment, the alarm patterns are generated using the special illumination which cannot be normally sensed, and the illumination of the alarm patterns and the person (object) are acquired as an image. The alarm pattern is detected from the acquired image, the information thereof is read, the image and the information of the alarm pattern are combined with each other, and the combined image is displayed. As a result, only a specific person (such as security staff) who operates the device which can read the alarm (the image acquisition unit 6, the image analyzing/combining unit 7, and the display unit 8) can detect a suspicious person and can acquire the information for identifying the suspicious person while the suspicious person and a permitted person do not recognize that they are being monitored. Moreover, it is possible to approach and catch a suspicious person without being recognized when the specific person travels while carrying the devices used for reading the alarm. In particular, when a plurality of devices according to this embodiment excluding the devices for reading the alarm are provided in a space to be monitored, the movement and behavior of the suspicious person can be observed more clearly, and thus it is possible to identify the suspicious person more readily, and to approach and catch the suspicious person.

Figure 7:
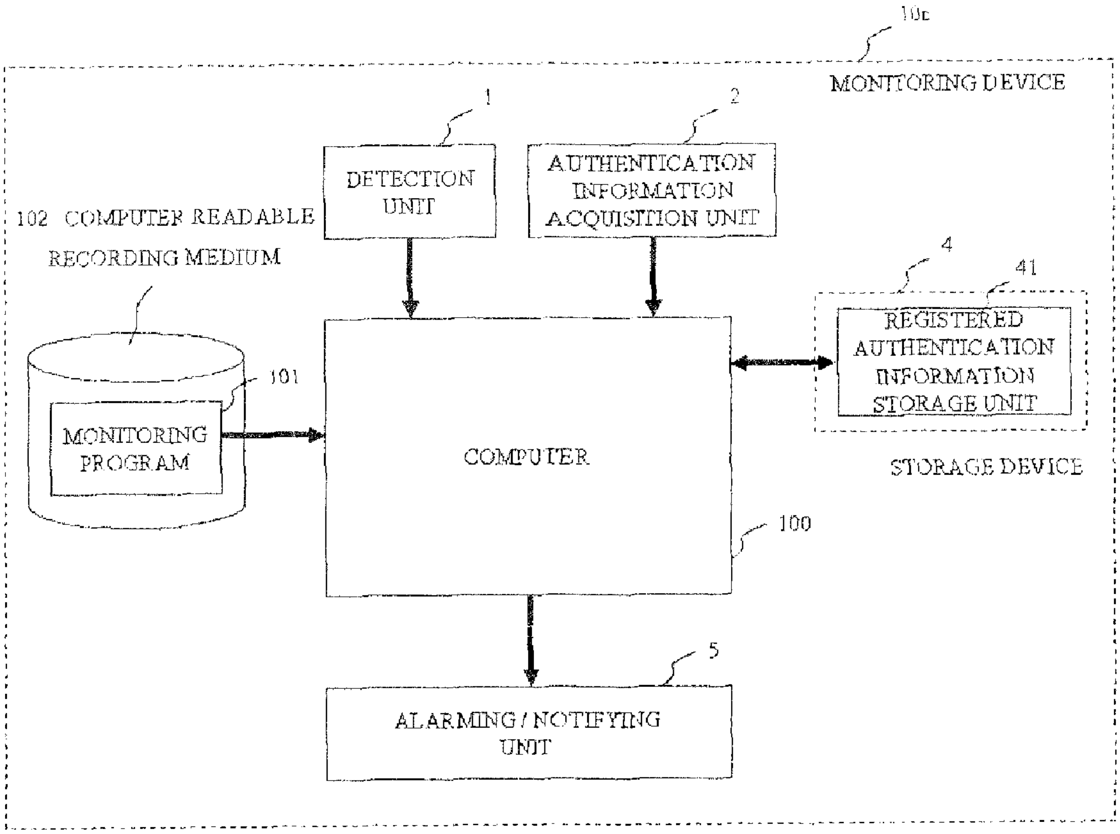
FIG. 7 is a block diagram illustrating an example of a configuration of a monitoring device according to a third embodiment of the present invention.

A detailed description is now given of a third embodiment of the present invention with reference to drawings. FIG. 7 is a block diagram illustrating an example of a configuration of a monitoring device according to the third embodiment. Referring to FIG. 7, a monitoring device 10*c* includes the detection unit 1, the authentication information acquisition unit 2, the alarming/notifying unit 5, and the storage device 4 including the registered authentication information storage unit 41, which are similar to those of the first embodiment and are connected to a computer 100. Moreover, a computer-readable recording medium (recording medium) 102 for storing a monitoring program (program for monitoring suspicious person) 101 is connected to the computer 100. The computer-readable recording medium 102 includes a magnetic disc, a semiconductor memory, or the like. The monitoring program 101 recorded in the computer-readable recording medium 102 is read by the computer 100 upon a startup of the computer 100, or the like, is read in a memory such as a random access memory (RAM) of the computer 100, and operates under control of a central processing unit (CPU). In this way, by controlling the operation of the computer 100, the computer 100 is caused to function as the determination unit 31 and the alarm pattern generation unit 32 of the data processing device 3 according to the first embodiment. Moreover, the computer 100 is caused to carry out the processing illustrated in FIGS. 2 and 3.

The monitoring program 101 causes the computer 100 to carry out at least the following procedures.

1. Receiving, from the detection unit 1, a notice indicating that a person (object) existing in the detection area is detected, and obtaining authentication information held by the detected object from the authentication information acquisition unit 2.

2. Reading registered authentication information indicating the admission into the detection area from registered authentication information storage unit 41.

3. Acquiring, based on the acquired authentication information and the registered authentication information, the number of registered authentication objects indicating the number of objects holding the registered authentication information, and the number of unregistered authentication objects indicating the number of objects holding authentication information which is not the registered authentication information.

4. Setting the alert mode when existence of an object is detected, and the number of registered authentication objects is zero.

5. Determining a suspicious object based on the number of registered authentication objects, the number of unregistered authentication objects, and the alert mode.

Moreover, it is possible to apply this embodiment to the monitoring device 10_b_ illustrated in FIG. 4. Further, though FIG. 7 illustrates the example in which the registered authentication information is stored in the registered authentication information storage unit 41 in the storage device 4 external to the computer 100, the registered authentication information may be stored in a memory (such as non-volatile memory) in the computer 100.

Though, in the above-mentioned respective embodiments, the monitoring devices for monitoring a person existing in the detection area are described as examples, it is possible to monitor an object other than a person such as an animal and a robot entering the detection area, and the present invention may be applied to a monitoring device used for such applications. Specifically, the detection unit 1 detects the existence of a person or other object. The authentication information acquisition unit 2 acquires authentication information held by the person and other object. Moreover, in FIGS. 2 and 3, the monitoring device may operate to monitor a person or a suspicious person as well as an object other than a person or a suspicious object.

As described above, an aspect of the monitoring device according to the present invention includes the determination unit for, when existence of a person (object) is detected in the detection area, based on the information including the number of pieces of the acquired registered authentication information, the number of pieces of the acquired unregistered authentication information, and the alert mode set when the number of pieces of the acquired registered authentication information is zero, determining existence of a suspicious person according to the plurality of conditions, and the alarm pattern generation unit for generating, when it is determined that the suspicious person exists, the different alarm patterns according to the determination conditions, and for issuing an alarm/notice of the alarm pattern from the alarming/notifying unit. It is possible, by employing this configuration, to detect the suspicious person, and to issue an alarm/notice of the state of the suspicious person in the detection area (state as to whether all or some persons in detection area are suspicious), and the information for identifying the suspicious persons. Moreover, even when a suspicious person without authentication information is detected in the detection area, and then, a person holding registered authentication information and thus holding the permission enters the detection area, the alarm/notice does not stop, and it is possible to continuously detect the suspicious person.

In this way, according to the preferred embodiments of the present invention, when existence of a person (object) is detected in the detection area, and when the number of pieces of the acquired registered authentication information is zero, it is determined that all the persons in the detection area are suspicious persons, the alert mode is thus set, and the alert state is maintained. As a result, even when a suspicious person without authentication information is detected in the detection area, and then, a person holding registered authentication information and thus holding the permission enters the detection area, the alarm/notice does not stop, and it is possible to continuously detect the suspicious person.

Moreover, when existence of a person (object) is detected in the detection area, based on the information including the number of pieces of the acquired registered authentication information, the number of pieces of the acquired unregistered authentication information, and the alert mode set when the number of pieces of the acquired registered authentication information is zero, existence of a suspicious person is determined according to the plurality of conditions, and, when it is determined that a suspicious person exists, the different alarm patterns according to the determination conditions are generated for identifying the suspicious person. As a result, it is possible to detect the suspicious person, to recognize the state of the suspicious person in the detection area (state as to whether persons in detection area are suspicious), and further, to identify the suspicious person by observing changes in alarm pattern caused by the entrance/exit to/from the detection area.

The present invention may be applied to a monitoring device for continuously detecting a suspicious person, and for issuing an alarm/notice of the detection of the suspicious person, the state of the suspicious person in the detection area, and the information for identifying the suspicious person, and may be applied to a program for realizing the monitoring device on a computer. Moreover, the function of issuing an alarm/notice of the detection of a suspicious person and of the information for identifying the suspicious person may be applied to devices and functions for security and crime prevention in property including residential housings and buildings, and in facilities including schools, companies, hospitals, airports, and other public facilities, to and from which many unspecified persons enter and exit.

Moreover, the present invention is not limited to the above-mentioned embodiments. Within the scope of the present invention, any modification, addition, or alteration as may readily occur to those skilled in the art can be made to respective components according to the above-mentioned embodiments.

What is claimed is:

1. A monitoring device, comprising:

a detection unit which detects an object in the detection area;

an authentication information acquisition unit which acquires authentication information on the object detected by the detection unit;

a registered authentication information storage unit which stores registered authentication information on the object admitted into the detection area; and a determination unit which acquires, based on the authentication information acquired by the authentication information acquisition unit and the registered authentication information, a number of registered authentication objects that indicates a number of objects holding authentication information which matches the registered authentication information, sets an alert mode when the number of registered authentication objects is zero, and issues a notice of alarm when the detection unit detects the object while the alert mode is set.

2. A monitoring device according to claim 1, wherein the determination unit resets, after the alert mode has been set, the alert mode when the detection unit no longer detects existence of the object.

3. A monitoring device according to claim 1, wherein the determination unit determines:

when the number of registered authentication objects is zero, that all objects in the detection area are suspicious objects;

when the number of registered authentication objects is at least one, and when the number of unregistered authentication objects is at least one, that some of the objects in the detection area are the suspicious objects; and when the alert mode is set in a state other than the above-mentioned two states, that the suspicious object exists in the detection area.

4. A monitoring device according to claim 1, further comprising an alarm pattern generation unit for generating an alarm pattern based on the result determined by the determination unit, wherein the notification unit issues a notice of the alarm using the alarm pattern.

5. A monitoring device according to claim 4, wherein the alarm pattern generation unit generates, when the number of registered authentication objects is at least one, when the number of unregistered authentication objects is zero, and when the alert mode is set, an alarm pattern which issues a notice of the number of registered authentication objects.

6. A monitoring device according to claim 4, wherein the notification unit comprises a device for generating light, and represents the alarm pattern as one of a shape of a light source and a shape of projected light.

7. A monitoring device according to claim 4, wherein the notification unit comprises a device for generating light, and represents the alarm pattern as one of a pattern of a light source and a pattern of projected light.

8. A monitoring device according to claim 4, wherein the notification unit comprises a device for generating light, and represents the alarm pattern as a flash timing.

9. A monitoring device according to claim 4, wherein the notification unit comprises a device for generating light, and represents the alarm pattern as a number of active lightings.

10. A monitoring device according to claim 4, wherein the notification unit comprises a device for generating light, and represents the alarm pattern as a combination of at least two of a shape of a light source, a shape of projected light, a pattern of the light source, a pattern of the projected light, a flash timing, and a number of active lightings.

11. A monitoring device according to claim 4, wherein:

the notification unit uses a lighting device which causes the alarm pattern to be insensible for normal visual recognition, and to be sensible from an image acquired by a corresponding imaging device; and the monitoring device further comprises:

an image acquisition unit which provides a function of imaging lighting corresponding to the lighting device, and a function of imaging the object;

an image analyzing/combining unit which analyzes the alarm pattern based on the image acquired by the image acquisition unit, and combines the imaged object and the analyzed alarm pattern into an image; and a display unit which displays the combined image.

12. A monitoring device according to claim 11, wherein the notification unit uses, as the lighting device, infrared illumination.

13. A monitoring device according to claim 11, wherein the notification unit uses, as the lighting device, fluorescent light flashing at high speed in a controllable flashing pattern.

14. A monitoring method, comprising:

storing registered authentication information on an object admitted into the detection area in a registered authentication information storage unit;

detecting existence of the object in the detection area;

acquiring authentication information held by the detected object;

acquiring, based on the acquired authentication information and the registered authentication information, a number of registered authentication objects that indicates a number of objects holding the registered authentication information;

setting an alert mode when the number of registered authentication objects is zero;

determining to issue a notice of alarm while the existence of the object is detected when the alert mode is set.

15. A monitoring method according to claim 14, further comprising:

generating an alarm pattern based on the result of the determining; and issuing the notice of the alarm using the generated alarm pattern.

16. A monitoring method according to claim 15, wherein the alarm pattern includes, when the number of registered authentication objects is at least one, when the number of unregistered authentication objects is zero, and when the alert mode is set, an alarm pattern which notifies the number of registered authentication objects.

17. A monitoring program stored in a non-transitory storage medium for monitoring an object existing in a detection area, causing a computer to carry out the procedures of:

acquiring a notice indicating detection of existence of the object in the detection area, and authentication information held by the detected object;

reading registered authentication information indicating admission into the detection area from a registered authentication information storage unit;

acquiring, based on the acquired authentication information and the registered authentication information, a number of registered authentication objects that indicates a number of objects holding the registered authentication information;

setting an alert mode when the number of registered authentication objects is zero; and determining to issue a notice of alarm while the existence of the object is detected when the alert mode is set.

18. A monitoring device according to claim 2, wherein the determination unit determines:

when the number of registered authentication objects is zero, that all objects in the detection area are suspicious objects;

when the number of registered authentication objects is at least one, and when the number of unregistered authentication objects is at least one, that some of the objects in the detection area are the suspicious objects; and when the alert mode is set in a state other than the above-mentioned two states, that the suspicious object exists in the detection area.

19. A monitoring device according to claim 5, wherein the notification unit comprises a device for generating light, and represents the alarm pattern as one of a shape of a light source and a shape of projected light.

20. A monitoring device according to claim 5, wherein the notification unit comprises a device for generating light, and represents the alarm pattern as one of a pattern of a light source and a pattern of projected light.

* * * * *